US007855830B2

(12) United States Patent
Inoue et al.

(10) Patent No.: US 7,855,830 B2
(45) Date of Patent: Dec. 21, 2010

(54) OPTICAL OUTPUT CONTROLLER AND ITS CONTROL METHOD

(75) Inventors: Shuji Inoue, Okayama (JP); Hiroshi Mitani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/532,018

(22) PCT Filed: Mar. 10, 2008

(86) PCT No.: PCT/JP2008/000500

§ 371 (c)(1), (2), (4) Date: Sep. 18, 2009

(87) PCT Pub. No.: WO2008/114492

PCT Pub. Date: Sep. 25, 2008

(65) Prior Publication Data

US 2010/0103503 A1 Apr. 29, 2010

(30) Foreign Application Priority Data

Mar. 19, 2007 (JP) ............................. 2007-070433

(51) Int. Cl.
*G02F 2/02* (2006.01)
*H01S 3/10* (2006.01)

(52) U.S. Cl. ......................... 359/326; 359/328; 372/22; 372/34

(58) Field of Classification Search ................. 359/326, 359/328; 372/21–22, 34, 29.021
See application file for complete search history.

(56) References Cited

U.S. PATENT DOCUMENTS 5,943,353 A 8/1999 Kaneko (Continued)

FOREIGN PATENT DOCUMENTS

JP 8-171106 7/1996

(Continued)

OTHER PUBLICATIONS

International Search Report issued Apr. 8, 2008 in International (PCT) Application No. PCT/JP2008/000500.

(Continued)

*Primary Examiner*—Hemang Sanghavi
(74) *Attorney, Agent, or Firm*—Wenderoth, Lind & Ponack, L.L.P.

(57) ABSTRACT

An optical output controller includes a wavelength conversion device operable to change the wavelength of pumped laser light; a heating/cooling unit operable to control the temperature of the wavelength conversion device; a temperature detector which detects the temperature of the wavelength conversion device; a temperature controller operable to control the heating/cooling unit such that the detected temperature corresponds to a target temperature; an optical output detector operable to detect the optical output from the wavelength conversion device; an optical-output maximization controller operable to determine a temperature at which the optical output is maximized according to the optical output detected by the optical output detector and from the detected temperature detected by the temperature detector and, further, outputs the temperature difference between the determined temperature and the detected temperature; and an adder which adds the temperature difference outputted from the optical-output maximization controller to the target temperature; wherein the temperature difference is added to the target temperature to correct the target temperature for maximizing the optical output.

5 Claims, 6 Drawing Sheets

U.S. PATENT DOCUMENTS

| | | | |
|---|---|---|---|
| 6,584,127 | B2 | 6/2003 | Matsumoto |
| 2002/0009105 | A1 | 1/2002 | Matsumoto |
| 2009/0014656 | A1 * | 1/2009 | Stenton et al. .............. 250/352 |
| 2009/0154509 | A1 * | 6/2009 | Suzuki et al. ................. 372/22 |

FOREIGN PATENT DOCUMENTS

| | | |
|---|---|---|
| JP | 10-20351 | 1/1998 |
| JP | 2001-168439 | 6/2001 |
| JP | 2002-158383 | 5/2002 |

OTHER PUBLICATIONS

International Preliminary Report on Patentability issued Oct. 1, 2009 in International (PCT) Application No. PCT/JP2008/000500.

* cited by examiner

3
OPTICAL-OUTPUT MAXIMIZATION CONTROLLER
TEMPERATURE CHARACTERISTIC IDENTIFICATION UNIT
OPTIMUM TEMPERATURE
31
DIFFERENCE DETECTOR
32
DETECTED OPTICAL OUTPUT
DETECTED TEMPERATURE
6
OPTICAL OUTPUT DETECTOR
5
TEMPERATURE DETECTOR
DETECTED TEMPERATURE
TARGET TEMPERATURE
PID
CURRENT SUPPLY
HEATING/ COOLING UNIT
WAVELENGTH CONVERSION DEVICE
11
12
2
4
1

$P_1 = f\ (T_1、T_m、P_m^*)$

TARGET TEMPERATURE
4
SET-TEMPERATURE CONTROL BLOCK
72
TEMPERATURE CONTROLLER
11
DRV
HEATING/ COOLING UNIT
12
KTP CRYSTAL
71
TEMPERATURE DETECTOR
5

OPTICAL OUTPUT CONTROLLER AND ITS CONTROL METHOD

BACKGROUND OF THE INVENTION

1. Technical Field

The present invention relates to an optical output controller and, more particularly, to an optical output controller for a laser light source employing a wavelength conversion device for use with a display and a method for controlling the same.

2. Background Art

A laser light source device employing a wavelength conversion device is required to maintain the wavelength conversion device at an optimum temperature, in order to maximize the optical output outputted from the wavelength conversion device. Such a wavelength conversion device has a mountain-shaped temperature characteristic which has a temperature at which the optical output is maximized. The temperature, at which the optical output is maximized, is referred to as "optimum temperature". Also, the optical output is decreased at higher and lower temperatures than the optimum temperature. The optimum temperature is determined by the characteristics of the wavelength conversion device itself and by the wavelength of the inputted laser light, and the like. Accordingly, if the temperature of the wavelength conversion device is fluctuated or the wavelength of the inputted laser light is varied, the optimum temperature is changed.

To cope therewith, conventionally, the temperature has been varied for determining a temperature at which the optical output is maximized, in search of an optimum temperature, as described in Japanese Patent Laid-open Publication No. 10-20351. Operations for gradually varying the temperature, detecting the optical output at the time and comparing the detected optical output are repeated, such that a temperature, at which the amount of light is maximized, is found and the found temperature is set as an optimum temperature. The optical output may be continuously maintained at a nearly maximum optical output by continuing the aforementioned operations.

FIG. 6 is a block diagram illustrating the structure of a conventional temperature control device for a wavelength conversion device (a potassium titanyl phosphate ($KTiOPO_4$): KTP crystal) which is described in Japanese Patent Laid-open Publication No. 10-20351. The structure thereof will be described, in brief. The signal processing apparatus is constituted by a temperature controller 11 which determines the difference between a commanded temperature and a detected temperature from a temperature detector 5 and outputs an appropriate amount of control for driving a heating/cooling unit 12, the heating/cooling unit 12 which, using the output therefrom, heats and cools the KTP crystal 71, the temperature detector 5 which detects the temperature of the KTP crystal 71, a set-temperature control block 72 for changing the set temperature, and an adder 4 which adds the output from the block to a target temperature. The set-temperature control block 72 repeatedly performs operations for outputting a temperature by which the target temperature should be changed, adding it to the target temperature to change the target temperature, detecting the optical output at the time and comparing the optical output for searching for a temperature which maximizes the light and for setting the temperature as an optimum temperature. Further, these operations are continued for continuously maintaining the optical output at a nearly maximum optical output.

SUMMARY OF THE INVENTION

However, the conventional method has had the problem of continuous fluctuations of the optical output, since the temperature of the wavelength conversion device is varied for varying the optical output in search of an optimum temperature. Further, there has been the problem of the necessity of time for finding an optimum temperature, since it generally takes time for varying the temperature. Accordingly, in cases where the conventional method is used for a light source of a display, the luminance is fluctuated or time is required for stabilizing the luminance, which is not preferable.

It is an object of the present invention to overcome the aforementioned problems in the related art and to provide an optical output controller and an optical output control method for a wavelength conversion device which take a short time for searching for an optimum temperature, without varying the optical output for searching for the optimum temperature.

An optical output controller includes:

a wavelength conversion device operable to change the wavelength of pumped laser light;

a heating/cooling unit operable to control the temperature of the wavelength conversion device;

a temperature detector operable to detect the temperature of the wavelength conversion device;

a temperature controller operable to control the heating/cooling unit such that the detected temperature corresponds to a target temperature;

an optical output detector operable to detect the optical output from the wavelength conversion device;

an optical-output maximization controller operable to determine a temperature at which the optical output is maximized according to the optical output detected by the optical output detector and the detected temperature detected by the temperature detector and, further, operable to output the temperature difference between the determined temperature and the detected temperature value; and an adder operable to add the temperature difference outputted from the optical-output maximization controller to the target temperature;

wherein the temperature difference is added to the target temperature to correct the target temperature for maximizing the optical output.

An optical output control method for a wavelength conversion device, includes:

(a) setting an optimum temperature at which the optical output from the wavelength conversion device is maximized at the state where the wavelength conversion device was designed, as a target temperature $T_m^*$ for use in controlling the temperature of the wavelength conversion device;

(b) detecting the temperature $T_1$ of the wavelength conversion device;

(c) detecting the optical output $P_1$ from the wavelength conversion device;

(d) setting the optimum temperature $T_m^*$ of the wavelength conversion device at the time of design, as a temporarily-set optimum temperature $T_{tmp}$;

(e) calculating the optical output $P_{tmp}$ at the detected temperature using the detected temperature $T_1$, the temporarily-set optimum temperature $T_{tmp}$ and a maximum optical output $P_m^*$;

(f) determining whether or not the absolute value of the difference between the calculated optical output $P_{tmp}$ and the detected optical output $P_1$ falls within a predetermined range $\Delta P$;

(g) determining which of the detected optical output $P_1$ and the calculated optical output $P_{tmp}$ is larger than the other one, if the step (f) results in the determination that the absolute value does not fall within the predetermined range $\Delta P$;

(h) if the step (g) results in $P_1 - P_{tmp} > 0$, substituting the difference $(T_{tmp} - \Delta T)$ resulted from the subtraction of a predetermined temperature $\Delta T$ from the temporary optimum temperature $T_{tmp}$, as a new $T_{tmp}$, for the temporary optimum temperature $T_{tmp}$, and, then, returning to the step (e);

(i) if the step (g) results in $P_1 - P_{tmp} < 0$, substituting the summation $(T_{tmp} + \Delta T)$ resulted from the addition of a predetermined temperature $\Delta T$ to the temporary optimum temperature $T_{tmp}$, as a new $T_{tmp}$, for the temporary optimum temperature $T_{tmp}$, and, then, returning to the step (e);

(j) outputting the temporary optimum temperature $T_{tmp}$ at this time as an optimum temperature $T_m$, if the step (f) results in the determination that the absolute value falls within the predetermined range $\Delta P$;

(k) calculating the temperature difference $\Delta T_m$ between the optimum temperature $T_m$ and the optimum temperature $T_m^*$ at the time of design; and (l) adding the temperature difference $\Delta T_m$ to the target temperature $T_m^*$ and controlling the temperature of the wavelength conversion device such that the wavelength conversion device becomes the updated target temperature $(T_m^* + \Delta T_m)$.

The optical output controller according to the present invention is constituted by a temperature control device 1, an optical output detector 6, a temperature-characteristic identification unit 31, a difference detector 32, and an adder 4. The optical output detector 6 detects the laser optical output generated from a wavelength conversion device 2. The temperature characteristic identification unit 31 determines an optimum temperature of the wavelength conversion device from a detected temperature outputted from a temperature detector 5 and a detected optical output outputted from the optical output detector 6. The difference detector 32 determines the difference between the detected temperature and the optimum temperature determined by the temperature-characteristic identification unit 31. The adder 4 adds the difference to a target temperature correction. Further, the temperature control device 1 is constituted by a temperature controller 11 which determines the difference between a commanded temperature and the detected temperature from the temperature detector 5 and outputs an appropriate amount of control for driving a heating/cooling unit 12, the heating/cooling unit 12 which, using the output therefrom, heats and cools the wavelength conversion device 2, and the temperature detector 5 which detects the temperature of the wavelength conversion device 2.

The difference between the detected temperature and the optimum temperature of the wavelength conversion device 2 which has been outputted from the temperature-characteristic identification unit 31 is added to a target temperature to provide a new target temperature, and the temperature control device 1 controls the temperature of the wavelength conversion device 2 such that it corresponds to the target temperature. A temperature characteristic of the wavelength conversion device 2 is calculated according to the detected temperature and the optical output outputted from the wavelength conversion device 2, using a pre-known relational expression with respect to a relationship between temperature and optical output characteristic of the wavelength conversion device 2. Based on the result thereof, a temperature, at which the optical output of the wavelength conversion device 2 is maximized, is determined, and the resultant temperature is outputted as an optimum temperature. The difference detector 32 calculates the difference between the optimum temperature and the detected temperature, and the adder 4 adds it to the target temperature to provide a new target temperature. These operations for the temperature control are continuously performed.

With the optical output controller according to the present invention, it is possible to eliminate the necessity of operations for continuously determining a temperature at which the optical output is maximized while varying the temperature. Further, it is possible to determine a temperature at which the optical output is maximized at the current operation state according to a detected optical output and a detected temperature and to perform control in such a way as to maintain the wavelength conversion device at this temperature, by utilizing a fact that the wavelength conversion device has a specific temperature characteristic. Accordingly, the optical output controller according to the present invention is characterized in that the optical output controller prevents the optical output from being changed during the process for varying the temperature, which enables use thereof as a light source for continuously outputting a stabilized optical output.

With the apparatus according to the present invention, it is possible to find an optimum temperature at which the optical output is maximized, by grasping the current temperature characteristic of the wavelength conversion device, without varying the temperature on purpose for varying the optical output in search of an optimum temperature. Further, it is possible to control the temperature of the wavelength conversion device to this temperature for maximizing the optical output.

Further, in order to cope with the fluctuations of the characteristic of the wavelength conversion device during operations, it is possible to identify the temperature characteristic, as needed, from the detected temperature and the detected optical output of the wavelength conversion device, which enables continuously controlling the temperature of the wavelength conversion device to an optimum temperature for maximizing the optical output.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Figure 1:
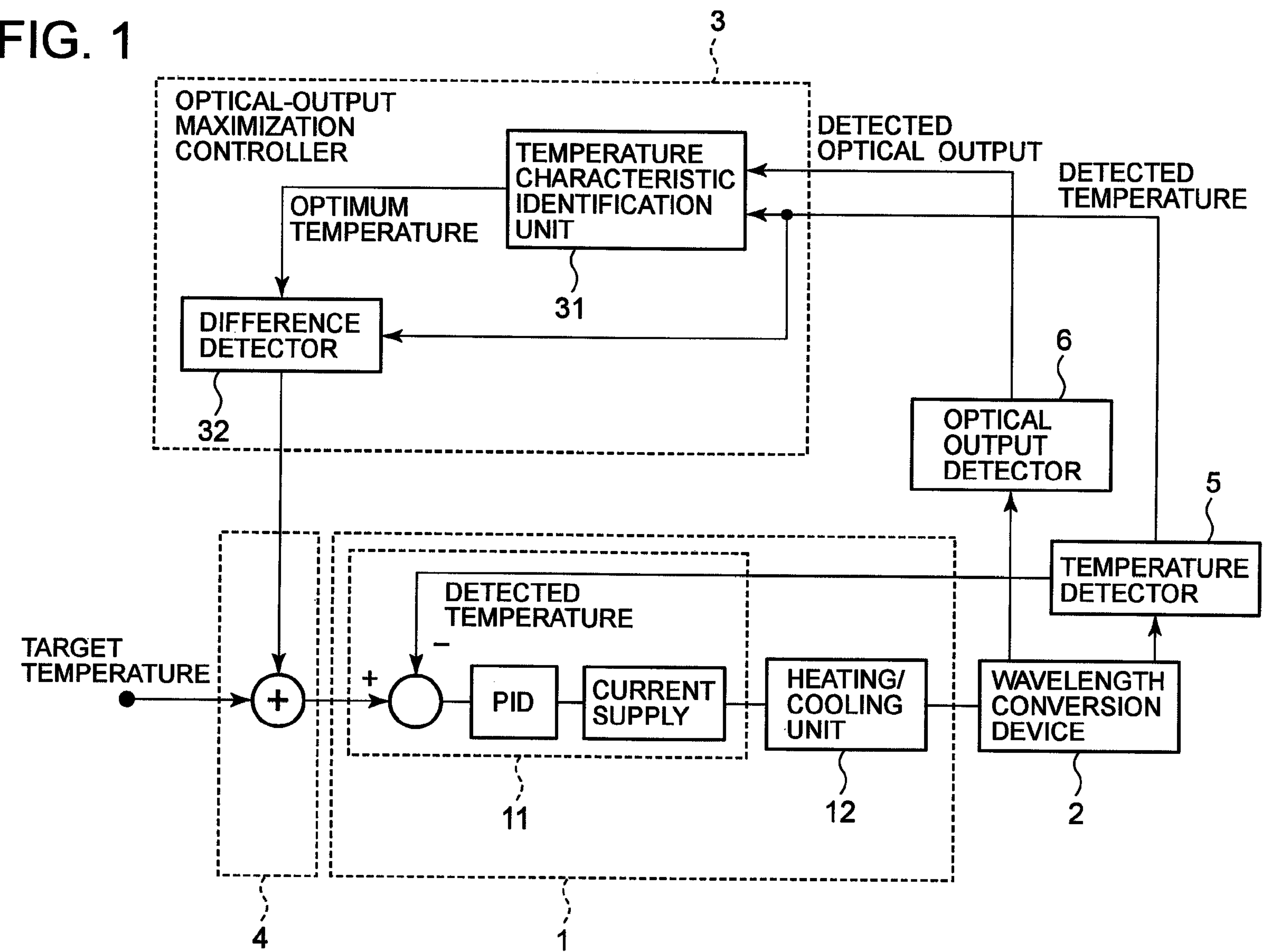
FIG. 1 is a block diagram illustrating the structure of an optical output controller according to a first embodiment of the present invention.

An optical output controller according to an embodiment of the present invention will be described, with reference to the accompanying drawings. Further, throughout the drawings, like reference characters substantially designate like components.

First Embodiment

FIG. 1 is a block diagram of an optical output controller according to a first embodiment of the present invention. The optical output controller includes a wavelength conversion device 2, a temperature detector 5, an optical output detector 6, a temperature control device 1, an optical-output maximization controller 3 and an adder 4. The wavelength conversion device 2 changes the wavelength of pumped laser light from a laser light source (not illustrated) and outputs it. The temperature detector 5 detects the temperature of the wavelength conversion device. The optical output detector 6 detects the optical output from the wavelength conversion device. The temperature control device 1 includes a heating/cooling unit 12 which controls the temperature of the wavelength conversion device 2, and a temperature controller 11 which controls the heating/cooling unit 12 such that the detected temperature corresponds to a target temperature. The optical-output maximization controller 3 determines a temperature at which the optical output is maximized according to the optical output detected by the optical output detector 6 and from the detected temperature detected by the temperature detector 5, and outputs the temperature difference between the detected temperature and the temperature at which the optical output is maximized. The adder 4 adds the temperature difference outputted from the optical-output maximization controller 3 to the target temperature.

Further, the optical-output maximization controller 3 includes a temperature-characteristic identification unit 31 which determines an optimum temperature from the detected temperature from the temperature detector 5 and the detected optical output from the optical output detector 6 and, further, includes a difference detector which determines the difference between the detected temperature and the optimum temperature determined by the temperature-characteristic identification unit 31.

The general outline of the operations of the optical-output controller will be described. At first, the heating/cooling unit 12 heats or cools the wavelength conversion device 2, and the temperature detector 5 detects the temperature of the wavelength conversion device 2 to obtain a detected temperature. On the other hand, the optical output detector 6 detects the optical output from the wavelength conversion device 2 to obtain a detected optical output. The optical-output maximization controller 3 determines an optical temperature using the detected temperature and the detected optical output and, further, determines the difference between the optimum temperature and the detected temperature. Thereafter, the adder 4 adds the temperature difference to the target temperature and inputs the result of the addition to the temperature controller 11, and the heating/cooling unit 12 is controlled by the output therefrom.

Figure 2A:
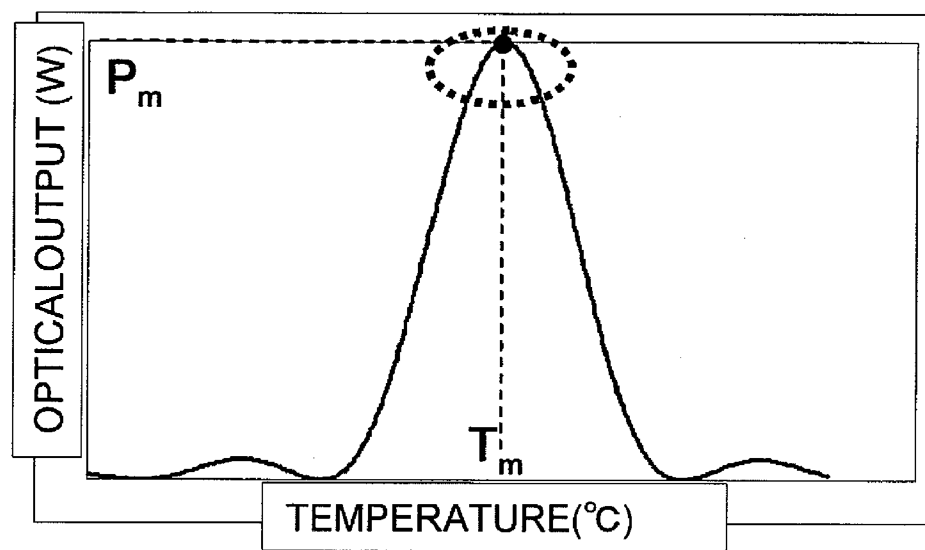
FIG. 2A is a view illustrating a temperature characteristic of the optical output from a wavelength conversion device.
Figure 2B:
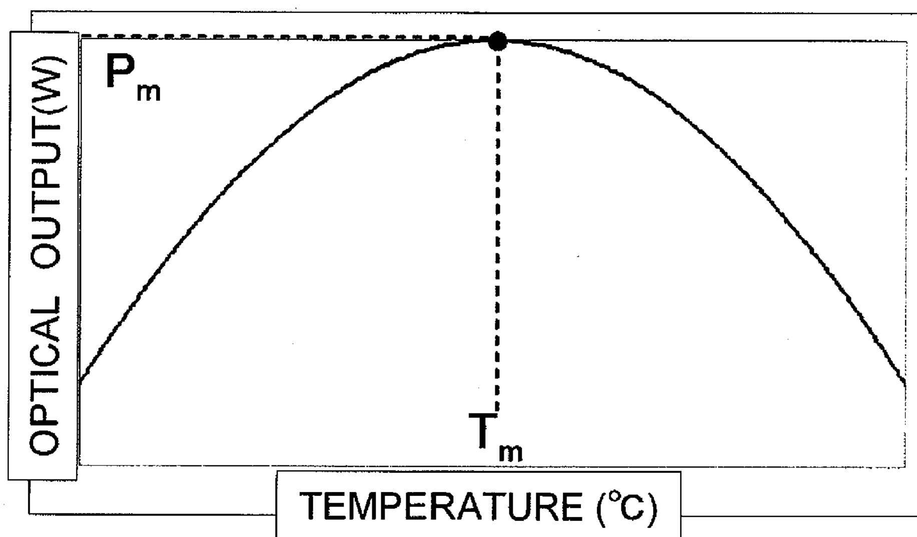
FIG. 2B is an enlarged view of the vicinity of a maximum optical output.

Further, with reference to FIG. 2A and FIG. 2B, there will be described a temperature characteristic of the optical output from the wavelength conversion device 2. FIG. 2A is a view illustrating a temperature characteristic of the optical output from the wavelength conversion device. The optical output from the wavelength conversion device 2 is maximized at a certain temperature such that the optical output is abruptly decreased at both higher and lower temperatures than the certain temperature. It is generally known that the shape of a curvature indicative of such a temperature characteristic of the optical output is expressed by a sinc function. FIG. 2B is an enlarged view of the vicinity of the maximum optical output. In this case, it is assumed that the optimum temperature, at which the optical output is maximized, is deemed to be $T_m$* and the designed optical output at this optimum temperature is deemed to be $P_m$*.

Figure 3A:
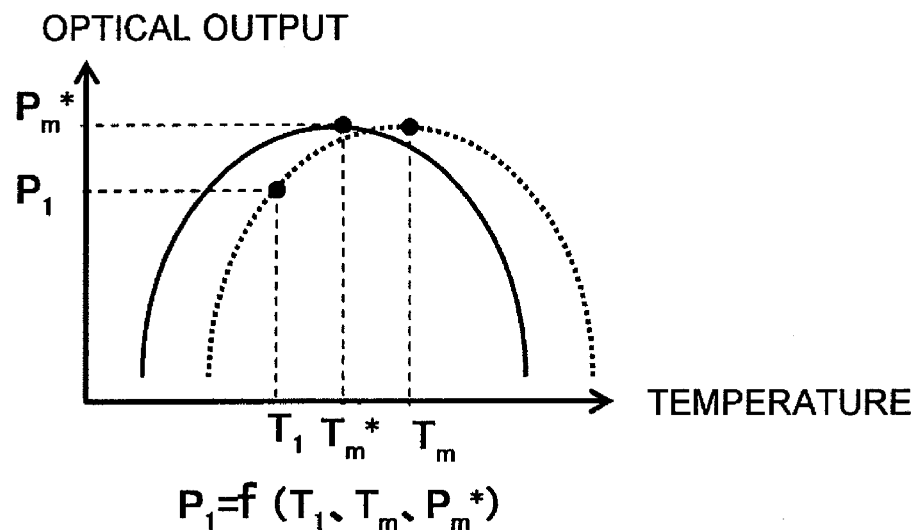
FIG. 3A is a schematic view illustrating a state where an optimum temperature $T_m$ of the wavelength conversion device is deviated from a designed temperature $T_m^*$.
Figure 3B:
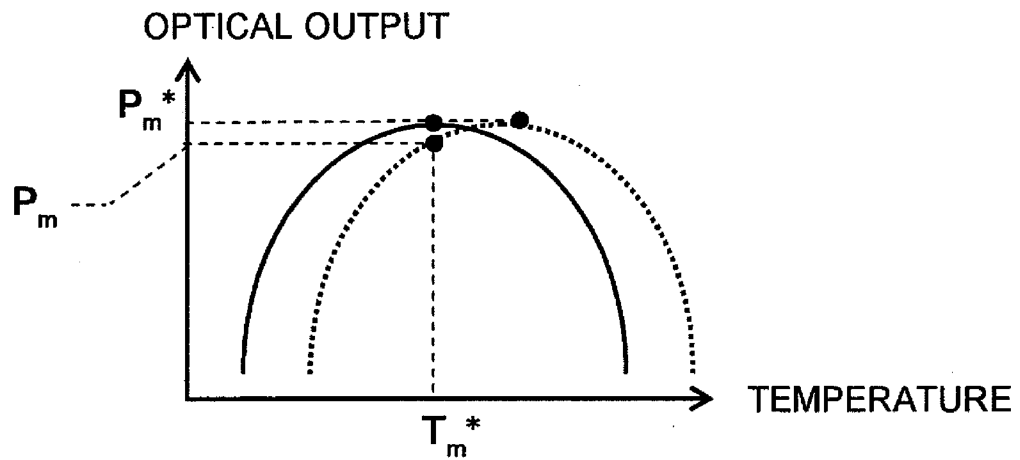
FIG. 3B is an explanation view of the first embodiment of the present invention.

Next, with reference to FIG. 3A and FIG. 3B, there will be described the operations of the optical-output maximization controller 3, in the case where the temperature characteristic of the optical output of the wavelength conversion device 2 is deviated from design optical output. FIG. 3A is a schematic view illustrating a state where the optimum temperature $T_m$ of the wavelength conversion device 2 is deviated from the designed temperature $T_m$*. A solid line represents calculated temperature characteristic of the optical output in the case where the optimum temperature at the time of design is set as $T_m$*, and a broken line represents an actual temperature characteristic of the optical output. A maximum optical output $P_m$* can be obtained at the optimum temperature $T_m$*, and the optical output P at an arbitrary temperature T can be expressed by a function of $P=f(T, T_m*, P_m*)$ using parameters of T, $T_m$* and $P_m$*. It is assumed that, in the actual characteristic represented by the broken line, the optimum temperature is $T_m$ and the optical output at this time is $P_m$*. In this case, if the temperature control is performed by assuming that the optimum temperature is $T_m$*, the optical output becomes $P_m$ which is smaller than the maximum optical output $P_m$*, as illustrated in FIG. 3B. Therefore, assuming that the optimum temperature is $T_m$ with respect to a detected temperature $I_1$ and the detected optical output $P_1$ at this time, there is satisfied the relationship $P_1=f(T_1, T_m, P_m*)$. By utilizing this relationship, it is possible to determine $T_m$ from $T_1$, $P_1$ and $P_m$*.

Figure 4:
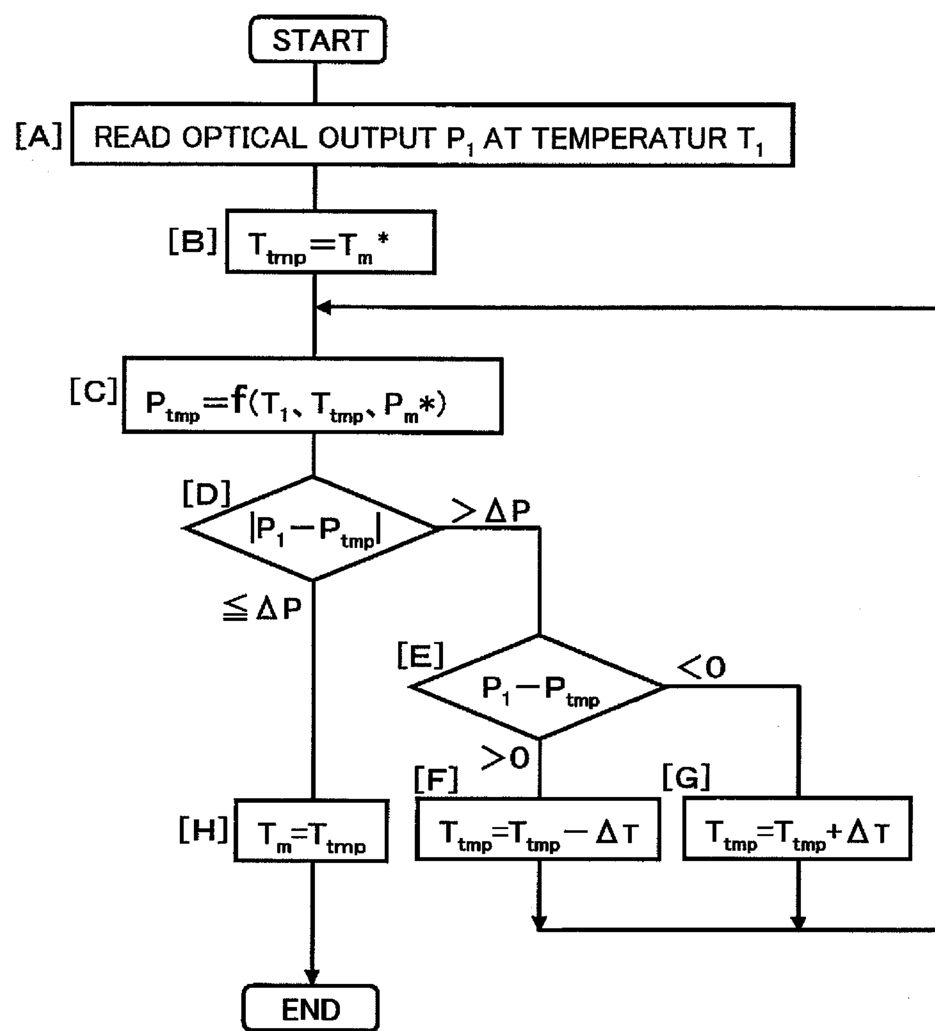
FIG. 4 is a flow chart of a method with which an optical output maximization controller determines an optimum temperature at which the optical output is maximized.

FIG. 4 is a flow chart of method of determining an optimum temperature $T_m$ which is performed at the temperature characteristic identification unit 31 in the optical-output maximization controller 3.

(a) At first, a detected temperature $T_1$ and a detected optical output $P_1$ of the wavelength conversion device 2 are obtained [A].

(b) An optimum temperature $T_m$* at the time of design is set as a temporary optimum temperature $T_{tmp}$. Thus, the substitution equation is represented as $(T_{tmp}=T_m*)$ [B].

(c) An optical output $P_{tmp}$ is determined from $P_{tmp}=f(T_1, T_{tmp}, P_m*)$, using the detected temperature $T_1$, the temporarily-set optimum temperature $T_{tmp}$ and a maximum optical output $P_m$* [C].

(d) A determination is made as to whether or not the absolute value of the difference between $P_{tmp}$ and $P_1$ falls within a predetermined optical output range $\Delta P$ [D].

(e) If the absolute value does not fall within the predetermined optical output range $\Delta P$, a determination is made as to which of $P_1$ and $P_{tmp}$ is larger than the other one [E].

Figure 5A:
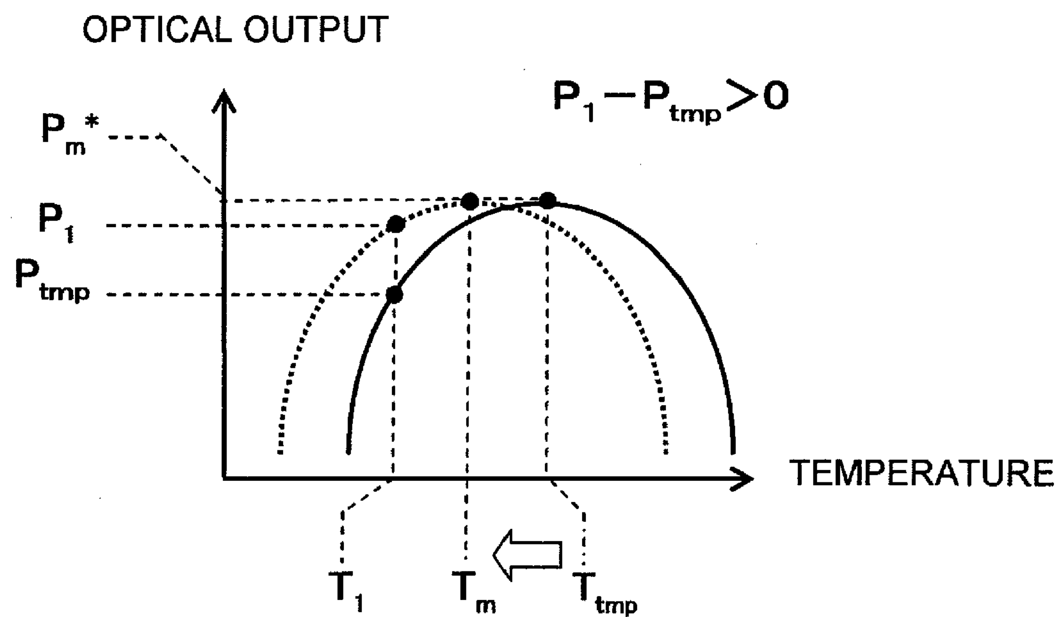
FIG. 5A is a schematic view illustrating a state in the case of $P_1 - P_{tmp} > 0$.

(f) FIG. 5A illustrates a state in the case of $P_1-P_{tmp}>0$. A solid line represents calculated optical output in the case of assuming that the optimum temperature is $T_{tmp}$, and a broken line represents actual optical output. In this case, the actual optimum temperature $T_m$ is lower than the temporary temperature $T_{tmp}$, as illustrated in FIG. 5A. Accordingly, the difference resulted from the subtraction of a predetermined temperature $\Delta T$ from $T_{tmp}$ is newly set as $T_{tmp}$ [F]. Thereafter, the processing is returned to [C].

In this case, it is assumed that the deviation of the optimum temperature is small, and the actual optimum temperature $T_m$ and the optimum temperature $T_m{}^*$ at the time of design exist in the same side with respect to the temperature $T_1$.

Figure 5B:
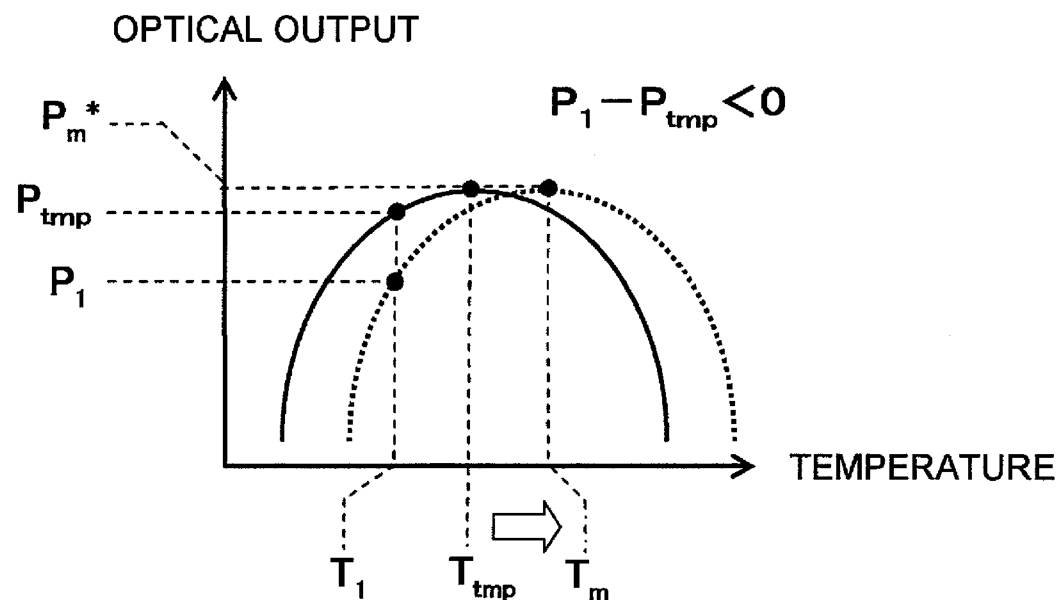
FIG. 5B is a schematic view illustrating a state in the case of $P_1 - P_{tmp} < 0$.
Figure 6:
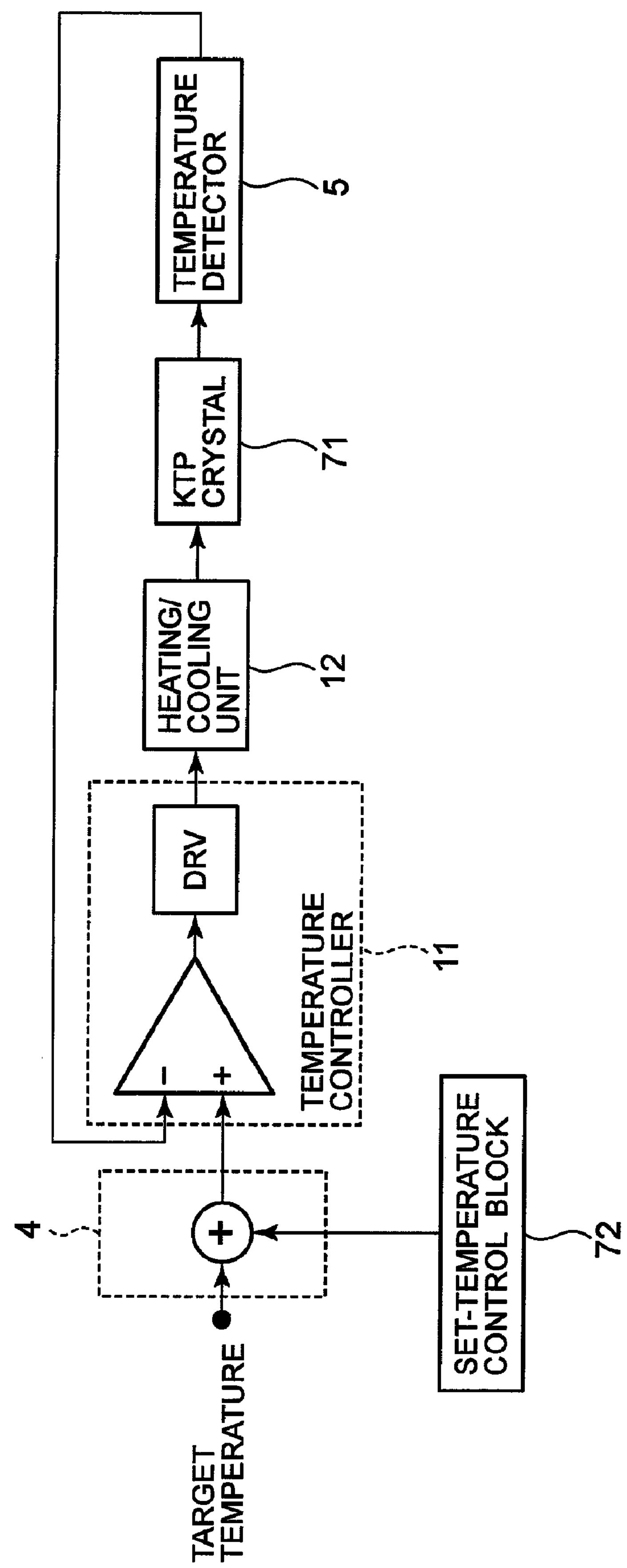
FIG. 6 is a block diagram illustrating the structure of a conventional temperature control device for a wavelength conversion device (a KTP crystal).

(g) On the other hand, FIG. 5B illustrates a state in the case of $P_1-P_{tmp}<0$. Similarly to in FIG. 5A, a solid line represents calculated optical output in the case of assuming that the optimum temperature is $T_{tmp}$, and a broken line represents actual optical output. In this case, as illustrated in FIG. 5B, the actual optimum temperature $T_m$ is higher than the temporary temperature $T_{tmp}$. Accordingly, the predetermined temperature $\Delta T$ is added to $T_{tmp}$, and the summation resulted from the addition is newly set as $T_{tmp}$ [G]. Thereafter, the processing is returned to [C].

(h) On the other hand, if the determination [D] results in the fact that the absolute value falls within $\Delta P$, the temporary temperature $T_{tmp}$ at this time is set as $T_m$, and the processing ends [H]. Thus, the optimum temperature $T_m$ has been determined.

By conducting the aforementioned processing periodically, it is possible to determine a newest optimum temperature $T_m$, even if the temperature characteristic of the optical output from the wavelength conversion device 2 is deviated from that at the time of design.

With the control method using the optical output controller, the wavelength conversion device 2 is controlled such that the optical output therefrom is maximized in the following way, after the optimum temperature $T_m$ is obtained.

(1) The difference detector 32 detects the difference $\Delta T_m$ between the optimum temperature $T_m$ and the detected temperature $T_1$ and outputs the difference $\Delta T_m$. In this case, it is assumed that the detected temperature $T_1$ is controlled by the temperature controller 11 and substantially corresponds to the target temperature $T_m{}^*$. Accordingly, there is satisfied the relationship $\Delta T=T_m-T_m{}^*$.

(2) The adder 4 adds the aforementioned difference $\Delta T_m$ to the target temperature $T_m{}^*$ to update the target temperature.

(3) The temperature control device 1 controls the temperature of the wavelength conversion device 2 such that the wavelength conversion device 2 becomes the updated target temperature ($T_m{}^*+\Delta T_m$). As a result of the temperature control, the updated target temperature ($T_m{}^*+\Delta T_m$) substantially corresponds to the actual optimum temperature $T_m$ and, therefore, the optical output from the wavelength conversion device 21 can be made to be a maximum optical output $P_m{}^*$.

Although the present invention has been previously described in detail with respect to a preferred embodiment, the present invention is not limited thereto, and it will be apparent to those skilled in the art that many preferable modifications and variations can be made to the present invention without departing from the technical scope of the invention which is defined by the claims.

The optical output controller according to the present invention is capable of controlling the temperature of a wavelength conversion device to an optimum temperature at which the optical output therefrom is maximized and is also capable of following the variation of the optimum temperature, without varying the temperature to which the temperature of the wavelength conversion device is to be controlled for varying the optical output therefrom in order to determine the optimum temperature. Therefore, even when the optical output controller is used with an optical source for a display, it is possible to control the temperature to an optimum temperature for maximizing the optical output therefrom, without fluctuating the luminance.

The present application is based on and claims the benefit of priority of Japanese Patent Application No. 2007-70433, filed on Mar. 19, 2007, the entire contents of which are incorporated herein to form a part of the specification of the present application.

The invention claimed is:

1. An optical output controller comprising:

a wavelength conversion device operable to change the wavelength of pumped laser light;

a heating/cooling unit operable to control the temperature of the wavelength conversion device;

a temperature detector operable to detect the temperature of the wavelength conversion device;

a temperature controller operable to control the heating/cooling unit such that the detected temperature corresponds to a target temperature;

an optical output detector operable to detect the optical output from the wavelength conversion device;

an optical-output maximization controller operable to determine a temperature at which the optical output is maximized according to the optical output detected by the optical output detector and the detected temperature detected by the temperature detector and, further, operable to output the temperature difference between the determined temperature and the detected temperature; and an adder operable to add the temperature difference outputted from the optical-output maximization controller to the target temperature, wherein the temperature difference is added to the target temperature to correct the target temperature value for maximizing the optical output.

2. The optical output controller according to claim 1, wherein the optical-output maximization controller includes:

a temperature-characteristic identification unit operable to calculate a temperature characteristic of the wavelength conversion device and operable to output a temperature at which the optical output from the wavelength conversion device is maximized; and a difference detector operable to calculate the difference between the detected temperature and the temperature outputted from the temperature-characteristic identification unit.

3. The optical output controller according to claim 1, wherein the optical-output maximization controller calculates a temperature characteristic of the wavelength conversion device from the detected temperature and the detected optical output and determines a temperature at which the optical output from the wavelength conversion device is maximized.

4. The optical output controller according to claim 1, wherein the optical output controller controls a laser light source.

5. An optical output control method for a wavelength conversion device, comprising:

(a) setting an optimum temperature at which the optical output from the wavelength conversion device is maximized at the state where the wavelength conversion device was designed, as a target temperature $T_m{}^*$ for use in controlling the temperature of the wavelength conversion device;

(b) detecting the temperature $T_1$ of the wavelength conversion device;

(c) detecting the optical output $P_1$ from the wavelength conversion device;

(d) setting the optimum temperature $T_m$* of the wavelength conversion device at the time of design, as a temporarily-set optimum temperature $T_{tmp}$;

(e) calculating the optical output $P_{tmp}$ at the detected temperature using the detected temperature $T_1$, the temporarily-set optimum temperature $T_{tmp}$ and a maximum optical output $P_m$*;

(f) determining whether or not the absolute value of the difference between the calculated optical output $P_{tmp}$ and the detected optical output $P_1$ falls within a predetermined range $\Delta P$;

(g) determining which of the detected optical output $P_1$ and the calculated optical output $P_{tmp}$ is larger than the other one, if the step (f) results in the determination that the absolute value does not fall within the predetermined range $\Delta P$;

(h) if the step (g) results in $P_1-P_{tmp}>0$, substituting the difference ($T_{tmp}-\Delta T$) resulted from the subtraction of a predetermined temperature $\Delta T$ from the temporary optimum temperature $T_{tmp}$, as a new $T_{tmp}$, for the temporary optimum temperature $T_{tmp}$, and, then, returning to the step (e);

(i) if the step (g) results in $P_1-P_{tmp}<0$, substituting the summation ($T_{tmp}+\Delta T$) resulted from the addition of a predetermined temperature $\Delta T$ to the temporary optimum temperature $T_{tmp}$, as a new $T_{tmp}$, for the temporary optimum temperature $T_{tmp}$, and, then, returning to the step (e);

(j) outputting the temporary optimum temperature $T_{tmp}$ at this time as an optimum temperature $T_m$, if the step (f) results in the determination that the absolute value falls within the predetermined range $\Delta P$;

(k) calculating the temperature difference $\Delta T_m$ between the optimum temperature $T_m$ and the optimum temperature $T_m$* at the time of design; and (l) adding the temperature difference $\Delta T_m$ to the target temperature $T_m$* and controlling the temperature of the wavelength conversion device such that the wavelength conversion device becomes the updated target temperature ($T_m$*$+\Delta T_m$).

* * * * *